UNITED STATES PATENT OFFICE 2,414,660

COPPER FUNGICIDES AND PROCESS OF PRODUCING SAME

Alexander A. Nikitin, Copperhill, Tenn., assignor to Tennessee Copper Company, New York, N. Y., a corporation of New Jersey No Drawing. Application June 27, 1942, Serial No. 448,846

9 Claims. (Cl. 260—113)

This invention relates to fungicides and comprises a new and useful fungicide and the process of making the same.

Fungicides are well known in which copper enters as an element such, for example, as Bordeaux mixtures. When a fungicide is sprayed on a crop it should be uniformly and evenly distributed over the entire surface of the crop to be effective and should efficiently adhere thereto, should stand what is called "weathering," and should be free from any injurious effect upon the crop. All fungicides with which I am familiar and in which copper enters as an active ingredient are lacking in one or more of these essentials. Furthermore, some of the fungicides are composed of a plurality of constituents which have to be mixed by an attendant when they are applied to the crop, and unless they are mixed in proper proportions and in the proper way their efficiency is reduced if not destroyed. They are undesirable for this reason.

Repeated attempts have been made with slight success to improve the physical properties of basic copper sulphate by the addition of supplementary materials such as vegetable flour. The addition of the alkali salts of the protein substances such as calcium caseinate helped to improve the covering properties of basic copper sulphate but it was found that the adherence of the spray residue of the copper fungicides was greatly reduced. The protein substances such as casein or soya flour by themselves did not improve the spreading properties since it was very difficult to disperse them in water without the addition of alkali. It should be emphasized that the deleterious action of alkali was not confined to the poor adherence only but it also rendered basic copper sulphate incompatible with organic insecticides, such as derris or pyrethrum. Further the handling of these protein substances for spray application required skill and knowledge not possessed by the average farmer.

The effort to introduce the protein substances such as casein failed when the casein was used without excessive amount of alkali since the final product was not readily wettable.

The present invention has for its object to provide a fungicide in which copper enters as an effective ingredient, which has highly toxic properties; which is chemically stable in the presence of alkalies such as lime and which is stable upon exposure to atmospheric action; which is readily wettable, and has good spreading and adhering properties, which is free of injurious effects on the crop, and which is ready to be applied to the crop by dusting or by merely dispersing the same in a suitable amount of water.

It was found that when a solution of a copper salt and an aluminum salt is precipitated with an alkali solution containing soya bean protein, or soaps of the fatty acids, the resultant copper alumino compound possesses greatly improved physical properties, such as spreading, sticking and dispersion, as well as high toxicity.

These new copper fungicides are copper alumino salts in which the aluminum is present in the form of aluminum hydrate as has been proved by chemical analyses. The soya bean protein or soaps of fatty acids is combined with the copper, through the aid of the alumina, to form the new compound which possesses greatly improved physical and chemical properties. The new copper fungicides are stable chemically when they are exposed to atmospheric action. They are compatible with lime and lead arsenate plus lime. They are also compatible with oil emulsions and with organic insecticides such as pyrethrum and rotenone. They also retain their neutral character in water suspension, and during storage.

The procedure which is followed in the preparation of the improved fungicide involves dissolving a copper salt in water with an aluminum salt, which is for convenience designated solution A.

I then introduce into a suitable amount of water a protein-containing material preferably soya bean flour (about 50% protein) or soaps of a fatty acid such as oleic, stearic or linoleic, together with an alkali such as ammonium hydroxide. This for convenience I designate solution B.

I then add solution B to solution A until the resulting slurry is approximately neutral (pH 6.8–6.9) thereby precipitating a basic copper alumino-sulphate proteinate. This precipitate is filtered and the filter cake is reduced to a finely divided powder, and it is then ready for use. This finely divided basic copper alumino-sulphate proteinate may be dusted on the crop or may be dispersed in water at various concentrations depending upon the crop and the extent of the fungus infection on the crop.

In making solution A the proportions of copper salt and aluminum salt employed may be varied, depending upon the amount of protein or soaps of fatty acids that are used. Thus, 30 parts of the aluminum sulphate $(Al_2(SO_4)_3.12H_2O)$ may be added to 100 parts copper sulphate $(CuSO_4.5H_2O)$ or the amount of aluminum sulphate may be decreased to any desired extent down to 5 parts of aluminum sulphate to 100 parts of copper sulphate.

In making solution B the concentration may be varied according to the character of the alkali used, since the amount of alkali used will depend upon the ratio between the copper sulphate and aluminum sulphate employed. In actual practice it is necessary to add solution B to solution A until complete precipitation takes place at about pH 6.8, which pH should not be substantially departed from in order to avoid the formation of soluble cupro ammonium compounds which form with an excess of ammonia. If the pH of the slurry is carried beyond that point the complete precipitation of the components will not be secured.

For the purpose of illustrating one embodiment of the inventive idea reference is made to the following example, but it is to be expressly understood that the invention is not limited to this specific example. The choice of the copper salt and aluminum salt to be used in solution A may be varied. The proportions of aluminum sulphate may be varied anywhere within 5% to approximately 30% of the copper sulphate employed. This gives from 1% to 10% alumina ($Al_2O_3$) in the finished product. Moreover any protein-bearing material, whether vegetable or animal, as well as soaps of fatty acids may be employed and the percentage thereof varied. However, the amount of protein material in solution B should be such as to give from 0.5 to 3.5% protein in the finished product.

As an example, dissolve in water 100 grams of copper sulphate and 25 grams of aluminum sulphate thus forming solution A. Then dissolve 1 to 7 grams of soya bean flour and 40 grams of ammonium hydroxide about 25% of $NH_3$ in water, thus forming solution B. Then add solution B to solution A until the resulting slurry reaches a pH of approximately 6.8, then filter the resulting precipitate and reduce it to a fine powder.

I discovered that when the aluminum and copper salts were precipitated in one operation with an alkali solution containing soya bean protein or the soap of a fatty acid they formed a copper alumino compound which furnished a higher amount of soluble copper and consequently was more effective in the control of fungus disease. Basic copper sulphate in the commonly available copper fungicides when in water suspension forms about 1.5 parts per million of soluble copper, which is not sufficient for the effective control of fungus disease. The amount of soluble copper is increased by the use of soya flour protein to about 24.5 parts per million. This is superior to calcium caseinate which increases the amount of soluble copper to 103.6 parts per million but it has such an inferior tenacity coefficient that soya bean protein is superior in performance.

It was noted that when a copper sulphate solution was precipitated with an alkali solution containing soya bean protein or soaps of fatty acids but without alumina, the resultant copper compounds such as basic copper sulphate or carbonate plus copper proteinate are practically unwettable by water. Further these compounds showed a reduced toxicity to spore germination, which is attributed to their lower wettability by water. When, however, soya bean protein or soaps of fatty acids are added to the alkali solution and an aluminum salt is precipitated with copper sulphate, the resultant copper compound is readily wettable.

The orientation of the molecules in the surfaces is a material factor in the wetting of the soya bean protein or the soaps of the fatty acids which are introduced into the copper fungicides. Apparently the hydrophylic, or friendly-to-water ends of the fatty acid molecules when they are precipitated in combination with the aluminum salt, are turned outward in the surface in such condition that they are easily wettable by water, while the hydrophobic or "greasy" ends are turned inward in the surface.

When a soluble aluminum salt is added to the copper sulphate solution and then precipitated with an alkali solution containing soya bean protein, or the soaps of fatty acids, the resultant copper compounds, such as copper alumino-carbonate and basic copper alumino-sulphate containing soya bean protein or soaps of fatty acids show greatly improved spreading and adherence properties. When an aluminum salt and copper sulphate solution are co-precipitated with an alkali free from soya bean protein or soaps of fatty acids, the resultant copper compound does not show any improvement in spreading properties. The best spreading and sticking properties are obtained only when soya bean protein and a soluble aluminum salt are introduced into the reagents before the precipitation of the copper compound has taken place. Particularly good results were secured in spore germination tests and in the spray field in the control of bitter rot on apples with basic copper alumino-sulphate proteinate.

The copper fungicides of the present invention possess superior toxicity or killing power to basic copper sulphate as shown by tests on culture suspension of *Macrosporium solani* and *Glomerella cingulata* spores, as follows:

| Expt. No. | Material | Dilution equivalent to Bordeaux mixture | Per cent Cu | Per cent spor germination | |
|---|---|---|---|---|---|
| | | | | Macrosporium solani | Glomerella cingulata |
| | Check | | | 87 | 89 |
| 1 | Basic copper sulphate. | 0.50-50 | 0.030 | 34 | 28 |
| 2 | ___do___ | 1.00-50 | .060 | 21 | 17 |
| 3 | ___do___ | 1.50-50 | .090 | 10 | 8 |
| 4 | Basic copper-alumino-sulphate-proteinate. | 0.50-50 | .030 | 20 | 17 |
| 5 | ___do___ | 1.00-50 | .060 | 11 | 3 |
| 6 | ___do___ | 1.50-50 | .090 | 3 | 2 |

The same advantages of the copper fungicides of the present invention were shown by extensive field tests that demonstrated vastly superior control of fungus diseases, as proved by increased yield of celery crops which are extremely sensitive to blight infection. This was in contrast to regular basic copper sulphate.

It is again emphasized that the spreading and adhesive properties of the new copper fungicide are superior to those of either the regular basic copper sulphate compounds or the compounds of copper and aluminum without protein. This is of great importance in order to insure completeness of contact between the pathogenic organism and the spray residue and especially so when used on glossy citrus leaves. Further these improved fungicides are readily dispersed in water and they will remain in suspension without the addition of an auxiliary dispersing agent.

The new copper fungicides have a much higher chemical stability when used in connection with insecticides such as arsenical compounds, pyrethrum and rotenone. When commonly available basic copper sulphates are used with arsenical compounds in a spray mixture it is required that lime should be used to reduce arsenical injury. The use of lime in this case reduces the effectiveness of the copper fungicide due to chemical interaction with the copper fungicide which has a tendency to decompose, as shown by its blackening, when it is in water suspension in combination with arsenicals plus lime. On the other hand, the new copper fungicide being compatible with lime and arsenicals and the fungicide remains stable and its effectiveness remains substantially unchanged. The buffering action toward weak organic acids makes these copper compounds safer to use on fruit and foliage, and thus extends their use to a greater variety of plants.

It should be noted that when the alumina ($Al_2O_3$) content is reduced to 1% and no protein is present the adherence property is only slightly improved and the covering property shows no improvement as compared with regular basic copper sulphate. Further when the alumina content of the final product is increased to about 10% and no protein is present the adherence of the resultant basic copper alumino-sulphate or copper alumino-carbonate is reduced. When the $Al_2O_3$ content is in a range between 1 and 10%, and the soya bean protein or soaps of fatty acids is in a range between 0.5 and 3.5% on the basis of the final product, the chemical stability and the physical properties, such as dispersing, spreading and sticking, are greatly improved as compared with regular basic copper sulphate, copper carbonate, or copper alumino compounds without protein. When no alumina is present the resultant basic copper sulphate or copper carbonate containing protein is repellent to water. This is especially true when the protein content of the compound is above 1%. On the other hand, when a mixture of copper sulphate and aluminum sulphate is precipitated with an alkali containing soya bean protein or soaps of fatty acids, the resultant basic copper alumino-sulphate or copper alumino-carbonate is readily wettable by water. The presence of the alumina group changes the properties of the resultant copper compound in the presence of the protein group from hydrophobic to hydrophylic.

While I prefer the use of copper sulphate and aluminum sulphate and soya bean flour and ammonia, it is to be understood that the invention is not limited to these constituents but that the inventive idea is susceptible of other embodiments within the limits of the appended claims. Other copper and aluminum salts and oxides may be used in place of copper sulphate and aluminum sulphate maintaining the same ratio between CuO and $Al_2O_3$; or in place of aluminum, salts of zinc may be used. Further the alkali used may be either volatile, such as ammonium hydroxide, or fixed such as the bases of sodium, potassium, calcium or magnesium; and in place of the preferred soya bean flour which contains about 53.6% protein dried skim milk, wheat flour or soaps of fatty acids such as oleic, stearic, linoleic may be used.

While I have described herein the soaps of the fatty acids as alternatives for the vegetable and animal proteins, the present application and claims are limited to the copper-alumino-protein species, the species embodying the soaps of the fatty acids being made the subject matter of a divisional application.

What is claimed is:

1. The process of manufacturing copper fungicides which comprises reacting an aqueous solution of copper and aluminum compounds selected from the group consisting of copper sulphate and copper carbonate and aluminum sulphate and aluminum oxide with an alkali and a protein selected from the group consisting of casein, soya flour, skim milk and wheat flour, the alkali and protein being added to the solution until the pH of the mixture becomes approximately neutral, and precipitating a basic copper salt-alumina-proteinate.

2. The process of manufacturing copper fungicides which comprises the reacting of an aqueous solution of copper and aluminum compounds selected from the group consisting of copper sulphate and copper carbonate and aluminum sulphate and aluminum oxide with an alkali and a protein, the alkali and protein being added to the solution until the pH of the mixture becomes approximately neutral, and precipitating a basic copper salt-alumina-proteinate.

3. The process of manufacturing copper fungicides which comprises preparing an aqueous solution of copper and aluminum compounds selected from the group consisting of copper sulphate and copper carbonate and aluminum sulphate and aluminum oxide, preparing an aqueous solution containing an alkali and a protein selected from the group consisting of casein, soya flour, skim milk and wheat flour, reacting the two solutions by mixing them together until the pH of the mixture becomes approximately neutral, and precipitating a basic copper salt-alumina-proteinate.

4. The process of manufacturing copper fungicides which comprises preparing an aqueous solution of copper and aluminum compounds selected from the group consisting of copper sulphate and copper carbonate and aluminum sulphate and aluminum oxide, preparing an aqueous solution containing an alkali and a protein, reacting the two solutions by mixing them together until the pH of the mixture becomes approximately neutral, and precipitating a basic copper salt-alumina-proteinate.

5. The process of producing a copper fungicide which comprises reacting an aqueous solution of copper and aluminum compounds selected from the group consisting of copper sulphate and copper carbonate and aluminum sulphate and aluminum oxide with ammonium hydroxide and soya bean protein, the alkali and protein being added to the solution until the pH of the mixture becomes approximately neutral, and precipitating a basic copper salt-alumina-proteinate.

6. The process of producing a copper fungicide which comprises preparing an aqueous solution of copper and aluminum compounds selected from the group consisting of copper sulphate and copper carbonate and aluminum sulphate and aluminum oxide, preparing an aqueous solution containing ammonium hydroxide and soya bean protein, reacting the two solutions by mixing them together until the pH becomes approximately neutral, and precipitating a basic copper salt-alumina-proteinate.

7. As a new fungicide product a basic copper salt-alumina-proteinate in which the copper salt is selected from the group consisting of copper sulphate and copper carbonate.

8. As a new fungicide product a basic copper salt-alumina-proteinate in which the copper salt is selected from the group consisting of copper sulphate and copper carbonate the alumina content being in the range between 1% and 10% and the protein content being in the range between 0.5% and 3.5%.

9. As a new fungicide product a basic copper salt-alumina-proteinate in which the copper salt is selected from the group consisting of copper sulphate and copper carbonate and the protein is selected from the group consisting of casein, soya flour, skim milk and wheat flour.

ALEXANDER A. NIKITIN.

Disclaimer 2,414,660.—*Alexander A. Nikitin*, Copperhill, Tenn. COPPER FUNGICIDES AND PROCESS OF PRODUCING SAME. Patent dated Jan. 21, 1947. Disclaimer filed Mar. 29, 1948, by the assignee, *Tennessee Copper Company*.

Hereby enters this disclaimer to the words "and copper carbonate" in lines 4 and 5 of claims 1, 3, 4, 5, and 6, and line 5 of claim 2.

[*Official Gazette May 4, 1948.*]